US008656776B2

(12) United States Patent
Trusov et al.

(10) Patent No.: US 8,656,776 B2
(45) Date of Patent: Feb. 25, 2014

(54) TEMPERATURE-ROBUST MEMS GYROSCOPE WITH 2-DOF SENSE-MODE ADDRESSING THE TRADEOFF BETWEEN BANDWIDTH AND GAIN

(71) Applicants: Alexander Trusov, Irvine, CA (US); Adam Schofield, Irvine, CA (US); Andrei Shkel, Irvine, CA (US)

(72) Inventors: Alexander Trusov, Irvine, CA (US); Adam Schofield, Irvine, CA (US); Andrei Shkel, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/666,494

(22) Filed: Nov. 1, 2012

(65) Prior Publication Data

US 2013/0074304 A1 Mar. 28, 2013

Related U.S. Application Data

(62) Division of application No. 12/918,284, filed as application No. PCT/US2009/033957 on Feb. 12, 2009, now Pat. No. 8,443,667.

(60) Provisional application No. 61/030,522, filed on Feb. 21, 2008.

(51) Int. Cl.
*G01C 19/56* (2012.01)
(52) U.S. Cl.
USPC ........................................ 73/504.12; 438/50
(58) Field of Classification Search
USPC ............................ 73/504.12, 504.14; 438/50
See application file for complete search history.

(56) References Cited

U.S. PATENT DOCUMENTS 7,284,430 B2 * 10/2007 Acar et al. ................ 73/504.12
2004/0206176 A1 * 10/2004 Willig et al. ............. 73/504.12

* cited by examiner

*Primary Examiner* — John Chapman, Jr.
(74) *Attorney, Agent, or Firm* — Marcus C. Dawes; Daniel L. Dawes

(57) ABSTRACT

The current invention is a novel gyroscope design, which yields devices robust to fabrication and environmental variations, allows flexible selection of operational parameters, and provides increased bandwidth with minimized sacrifice in gain regardless of the selected frequency of operation. The gyroscope has a single degree-of-freedom (DOF) drive-mode and a 2-DOF sense-mode. The drive-mode operational frequency and the sense-mode bandwidth can be selected arbitrarily in the proposed design, relaxing the tradeoff between the gain, die size, and detection capacitance. The symmetry of the structure ensures the optimal location of the drive-mode resonance relative to the sense-mode operational region, even in presence of fabrication imperfections.

3 Claims, 14 Drawing Sheets

(b) Sense-mode frequency spacing scaling, while the desired operational frequency is kept constant at 2.6.

(a) With lateral-comb drive electrodes.

(b) With parallel-plate drive electrodes.

(a) Implementation #2: crab-shaped, with parallel-plate drive electrodes (b) Implementation #3: frame-shaped, with parallel-plate drive electrodes

TEMPERATURE-ROBUST MEMS GYROSCOPE WITH 2-DOF SENSE-MODE ADDRESSING THE TRADEOFF BETWEEN BANDWIDTH AND GAIN

RELATED APPLICATIONS

The present application is related to U.S. Provisional Patent Application Ser. No. 61/030,522, filed on Feb. 12, 2008, which is incorporated herein by reference and to which priority is claimed pursuant to 35 USC 119.

GOVERNMENT RIGHTS

This invention is made with Government Support under Grant number CMS0409923, awarded by the National Science Foundation. The Government has certain rights in this invention.

BACKGROUND OF THE INVENTION

1. Field of the Invention

The invention relates to the field of micromachined virbratory gyroscopes, in particular gyroscopes with a one degree-of-freedom drive mode and a two degree-of-freedom sense mode.

2. Description of the Prior Art

The operation of all micromachined vibratory gyroscopes is based on a transfer of energy between two modes of vibration caused by the Coriolis effect. Conventional implementations often utilize single degree of freedom drive and sense-modes. Several of these conventional implementations reported gyroscopes with structurally symmetrical designs aimed at mode-matched operation. In such implementations, the mechanical gain is increased proportionally to the sense-mode quality factor. Additionally, mode-matching feedback control can be employed to improve sensitivity by electronically tuning the drive- and sense-modes. Alternatively, parametric excitation of the drive-mode providing large amplitudes over a wide range of frequencies can be used to eliminate the frequency mismatch between the drive- and sense-modes. However, mode-matched operation has practical challenges, requiring precise matching of the operational modes over wide temperature ranges. As a result of mode-matched operation, the increased sensitivity is achieved at the cost of sensor robustness, temperature bias drift, bandwidth and linear operational range.

Alternatively, the modes of operation can be designed with a certain frequency mismatch. Even though this approach improves the robustness and the bandwidth characteristics, the improvements are limited due to the dimensionality of the design space. Restrictions of design approaches with single-DOF drive- and sense-modes dictate a tradeoff between achieved robustness/bandwidth and gain.

Structural design approaches leading to robust gyroscopes are an intriguing option to consider. Several approaches have been previously explored including a design of a non-resonant gyroscope with 2-DOF drive- and 2-DOF sense-modes, and a gyroscope design with a 2-DOF drive-mode and 1-DOF sense-mode. Previously reported designs illustrated that the increase of system dimensionality and careful selection of system parameters may lead to an increase of system robustness. However, increasing the number of degrees of freedom in the drive-mode may not be the best choice as it requires actuation of the drive-mode at a non-resonant frequency, which is less efficient than resonant actuation.

For increasing robustness of vibratory gyroscopes, it is beneficial to design 1-DOF drive- and 2-DOF sense-modes so that the drive-mode resonant frequency is placed between the two resonant peaks of the sense-mode. A single-DOF drive-mode is more suitable for resonance-locking closed loop operation, similar to conventional gyroscopes. A 2-DOF sense-mode provides extended design flexibility and robustness by utilizing a dynamically coupled response when the drive-mode is operated in between the two coupled resonant peaks. For example, one such design found in the prior art has been demonstrated to provide robust operation with a 200 Hz bandwidth using a micromachined prototype with a 750 Hz operational frequency. For this design concept, increasing the operational frequency would further increase the bandwidth, while also resulting in a decrease of the sensitivity.

Most real-world applications such as automotive, military, and consumer electronics require robust yet sensitive gyroscopes with operational frequencies above several kHz in order to suppress the effect of environmental vibrational noise. At the same time, the desired mechanical bandwidth of the sense-mode is typically above 100 Hz, but not more than 400 Hz.

Previous gyroscopes employing a 2-DOF sense-mode rely on a dynamic vibration absorber (DVA) structure, in which the frequency response characteristics strongly depend on both the operational frequency and the ratio between the smaller and the bigger sense-mode masses. In this case, the gain of the gyroscope is inversely proportional to the spacing between the sense-mode peaks. Adapting the DVA-based gyroscope design for operational frequencies above 1 kHz while maintaining the sense-mode peaks at a practical spacing is challenging due to the limitation of the design space and involves a stringent tradeoff between the die size and detection capacitance.

Therefore, a new gyroscope design concept is desired which would preserve the advantages of the multi-DOF concept, while eliminating the scaling tradeoff and allowing flexible selection of required bandwidth and arbitrary high operational frequencies.

BRIEF SUMMARY OF THE INVENTION

According to the embodiments presented herein, there is provided a 3-degree of freedom (DOF) dynamic gyroscopic system comprising an outer frame, a central anchor, a detection mass coupled to the central anchor, a 1-DOF drive subsystem, a 2-DOF sense subsystem, and a symmetrically-decoupled suspension subsystem coupling the drive subsystem to the outer frame and to the sense subsystem.

In one embodiment, the drive subsystem, sense subsystem and symmetrically-decoupled suspension subsystem comprises two drive-mode shuttles coupled to the outer frame, two sense-mode shuttles coupled to the outer frame, wherein each drive-mode and sense-mode shuttle is constrained to translate only along its respective x or y axis, and a proof mass coupled to the two drive-mode shuttles, the two sense-mode shuttles, and the detection mass.

Another embodiment of the 3-DOF dynamic gyroscope system is where the two drive-mode shuttles and the two sense-mode shuttles are coupled to the outer frame and to the proof mass via a plurality of uni-directional springs. The 3-DOF dynamic gyroscope system further comprises the proof mass being suspended in the x-y plane by the symmetrically-decoupled suspension system, the proof mass being driven by the drive subsystem along the x-axis to form a z-axis-rotation-sensitive element, and the detection mass being constrained by the symmetrically-decoupled suspension system to y-axis deflections.

In another embodiment, the 3-DOF gyroscope system the detection mass, proof mass form the coupled 2-DOF sense subsystem, wherein during rotation of the proof mass, the proof mass generates a y-axis Coriolis force, and wherein the y-axis constrained detection mass absorbs the Coriolis force from the proof mass and efficiently responds in a wide band formed by the two coupled resonant peaks.

In yet another embodiment, the symmetrically-decoupled suspension subsystem of the 3-DOF dynamic gyroscope system comprises means for defining a sense-mode bandwidth by two resonant peaks and the frequency region in between in order to achieve optimal gain-bandwidth characteristics.

In yet another embodiment, the symmetrically-decoupled suspension subsystem of the 3-DOF dynamic gyroscope system subsystem comprises means for optimally placing an operational frequency between the sense-mode bandwidth peak spacing of the gyroscope.

In yet another embodiment, the parameters of the detection mass, drive subsystem, sense subsystem and symmetrically-decoupled suspension subsystem of the 3-DOF dynamic gyroscopic system comprise means for providing increased gain and sensitivity depending on a predetermined value of the mass ratio of the proof mass and the detection mass.

In yet another embodiment, each drive-mode shuttle and each sense-mode shuttle of the 3-DOF dynamic gyroscopic system further comprise a plurality of capacitive electrodes for the actuation, detection, and control of the proof mass in the x and y directions.

In yet another embodiment, the detection mass of the 3-DOF dynamic gyroscope system further comprises a plurality of capacitors to detect the oscillations induced by the Coriolis force of the proof mass.

In yet another embodiment, the 3-DOF dynamic gyroscope system further comprises means for the gyroscope to be adapted for use as an angular rate sensor for various applications such as camera stabilization, personal navigation, global positioning system augmentation, and electronic stability control in automobiles.

According to another embodiment provided herein, there is provided a method of operating a 3-DOF dynamic gyroscope system comprising suspending a proof mass in the x-y plane by a symmetrically-decoupled suspension system, driving the proof mass along the x-axis to form a z-axis rotation sensitive element by a drive subsystem, and constraining a detection mass to y-axis deflections by the symmetrically-decoupled suspension system.

In another embodiment, the method further comprises rotating the proof mass, thus generating a y-axis Coriolis force, and absorbing the Coriolis force in the detection mass.

In yet another embodiment, where suspending a proof mass in the x-y plane by a symmetrically-decoupled suspension system of the method comprises defining a sense-mode bandwidth by two resonant peaks and the frequency region in between in order to achieve optimal gain-bandwidth characteristics.

In yet another embodiment, wherein the symmetrically-decoupled suspension system of the method further comprises optimally placing an operational frequency between the sense-mode bandwidth resonant peaks.

In yet another embodiment, the method further comprises actuating detecting, and controlling the proof mass in the x and y directions via a plurality of capacitive electrodes.

In yet another embodiment, the method of rotating the proof mass further comprises detecting the oscillations induced by the Coriolis force of the proof mass.

According to an embodiment presented herein, there is provided a method of manufacturing a 3-DOF dynamic gyroscopic system which yields implementations to a pre-selected operational frequency and sense-mode peak spacing comprising selecting two drive-mode shuttles, two sense-mode shuttles, a detection mass, and a proof mass, calculating the required amount and location of a plurality of suspension elements according to the pre-selected operational frequency and sense-mode spacing, and coupling the suspension elements to the two drive-mode shuttles, the two sense-mode shuttles, the detection mass, and the proof mass.

In another embodiment of the method, the two drive-mode shuttles, the two sense-mode shuttles, the detection mass, and the proof mass are selected based on a desired die size and capacitance of the 3-DOF dynamic gyroscope system.

In a final embodiment, the method of manufacturing the 3-DOF dynamic gyroscope system comprises ensuring that the operational frequency is optimally located between the sense-mode peaks even in the presence of large fabrication imperfections.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
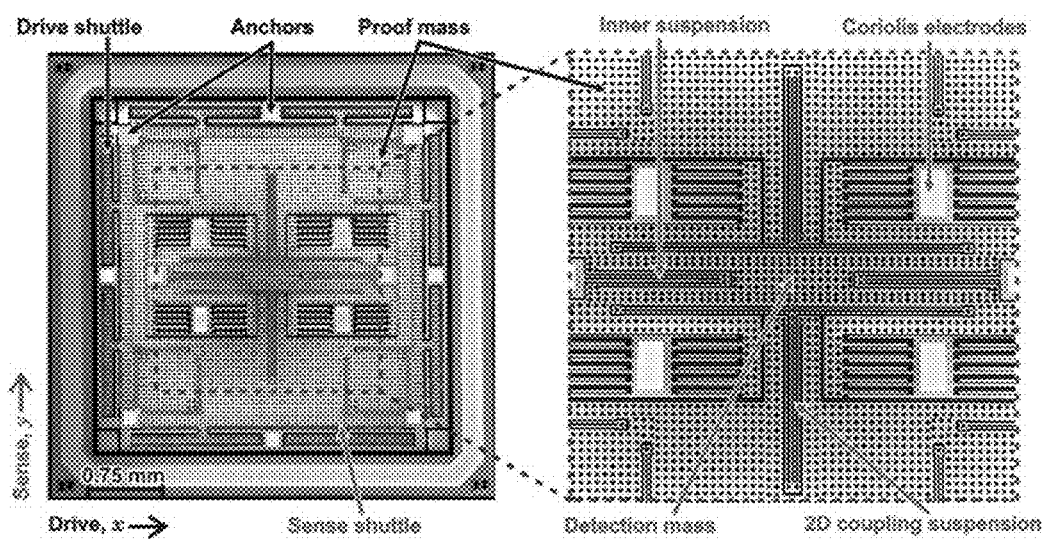
FIG. 1 is a top view of the micromachined gyroscope with 1-DOF drive mode and a fully coupled 2-DOF sense-mode providing wide temperature robust bandwidth while minimizing the sacrifice in gain.

The current invention extends the design space of the previously reported gyroscopes with 2-DOF sense-modes and overcomes the limitations imposed by the sense-mode DVA dynamics. The device, shown in FIG. 1, is not just a minor optimization of previously reported designs, but rather a sharp conceptual deviation that introduces a new design architecture based on a different arrangement of structural components favorably shaping the response characteristics of robust gyroscopes.

Figure 2A:
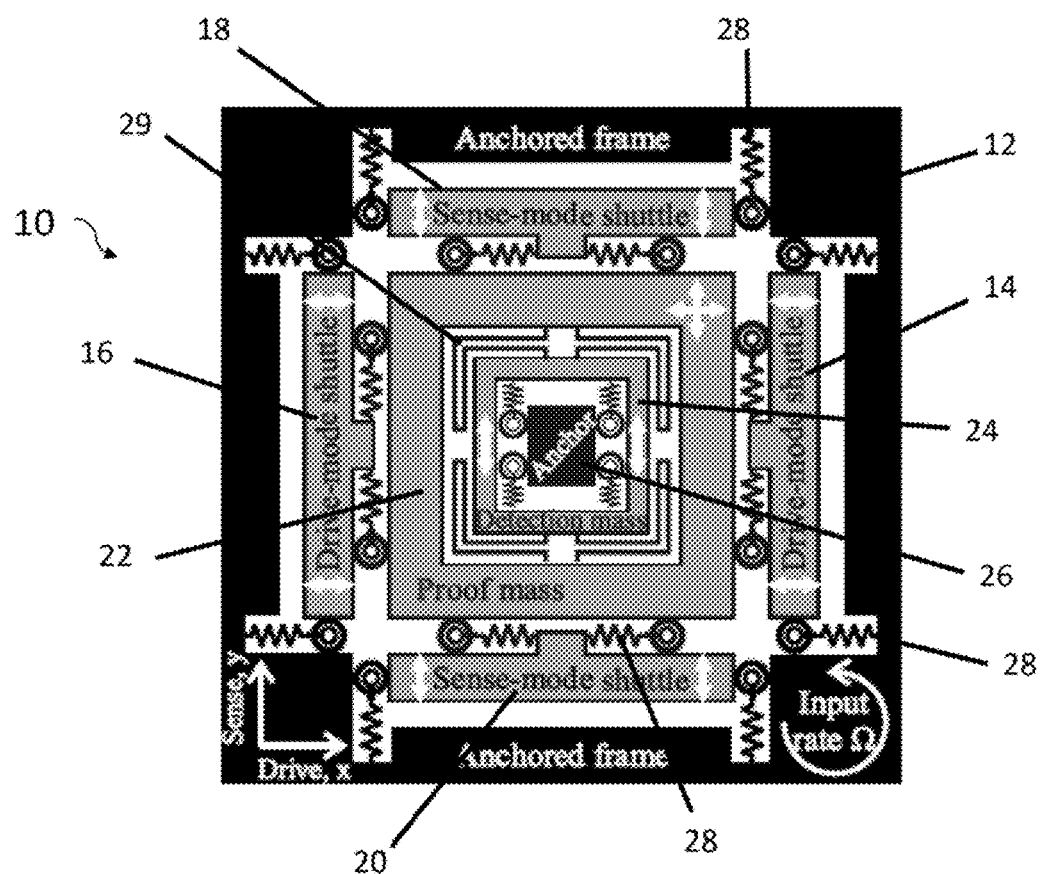
FIG. 2a is a schematic diagram of the complete structure of the gyroscope.

The general structural diagram of the proposed gyroscope concept is shown in FIG. 2a and is noted generally be reference numeral 10. The structure consists of an anchored outer frame 12, two drive-mode shuttles, 14, 16 two sense-mode shuttles 18, 20, a proof mass 22, a detection mass 24, and a central anchor 26. These structural elements are coupled in a novel way to provide a 1-DOF drive- and 2-DOF sense-modes. The design space comprises five mechanical design parameters as described below.

The outer frame 12 is anchored to the substrate. The substrate (not shown) may be any material or material composite now known or later devised to those skilled in the relevant art. Each of the two drive-mode shuttles 14, 16 and each of the two sense-mode shuttles 18, 20 are suspended relative to the outer frame 12 by two unidirectional springs, generally noted as reference numeral 28. The springs 28 restrict the motion of the shuttles 14, 16, 18, and 20 to their respective axes, which is the horizontal x axis of FIG. 2a for the drive-mode shuttles 14, 16 and the vertical y axis of FIG. 2a for the sense-mode shuttles 18, 20. Additional unidirectional springs 28 are used to couple the four shuttles 14, 16, 18, and 20 to the proof mass 22. Alternatively, other suspension means now known or later devised to those skilled in the relevant art may be used without departing from the spirit and scope of the invention. The described configuration of four shuttles 14, 16, 18, and 20, sixteen springs 28, which are identical and have an individual stiffness denoted by $k_1/8$, and the proof mass 22 forms a symmetrically decoupled suspension. The current invention utilizes the conceptual architecture of the suspension as described above in a gyroscope with a 2-DOF sense-mode for the first time.

The proof mass 22 can translate along both x (drive) and y (sense) axes. Using the electrodes on the drive-mode shuttles 14 and 16, the proof mass 22 is driven into a drive-mode oscillation to form a Coriolis element sensitive to rotation along the z-axis, which is perpendicular to the plane of FIG. 2a. However, unlike previous devices found in the prior art, the Coriolis induced motion is not directly picked-up from the proof mass 22. Instead, the proof mass 22 is coupled to a second, detection mass 24, $m_d$, by bidirectonal springs 29. The coupling springs 29 are bi-directional, with equal x and y stiffnesses $k_2$. The detection mass 24 is also coupled to the substrate with an inner unidirectional suspension 28, $k_3$.

During rotation, the Coriolis acceleration of the proof mass 22 is transferred to the detection mass 24, which responds in a wide frequency bandwidth due to the coupled dynamics of the proposed 2-DOF sense-mode. Since the detection mass 24 deflection is constrained to the y direction sense-mode, the quadrature is minimized.

Figure 2B:
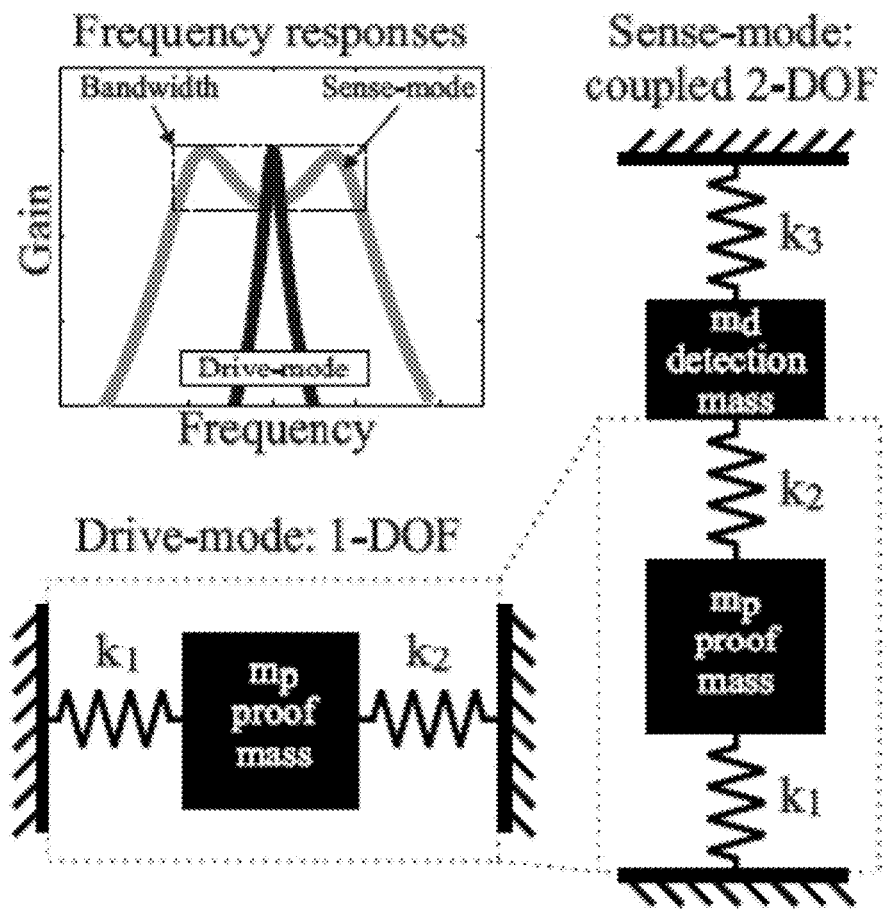
FIG. 2b is a diagram of the drive- and sense-mode lumped models, while the inset is a graphical representation of the response characteristics of the gyroscope.

We denote the sum of the proof mass 22 and two drive-mode shuttles 14 and 16 by $m_p$ and the detection mass 24 by $m_d$. The mass ratio is defined as $$\mu^2 = \frac{m_d}{m_p}$$

and is generally less than one. FIG. 2b shows the lumped element drive and sense dynamic model of the proposed gyroscope 10 (dampers are not shown for simplicity). The drive-mode is a single-DOF system with mass $m_p$ and stiffness $k_1+k_2$. The sense-mode is a complete 2-DOF system, with two masses, $m_p$ and $m_d$, and three stiffnesses $k_1$, $k_2$, $k_3$. The damping terms $c_1$, $c_2$, and $c_3$ are located parallel to the respective spring elements 28. Even though the design includes multiple structural elements, the x-y symmetry ensures that the proof mass'part of the 2-DOF sense-mode replicates the 1-DOF drive-mode, as shown symbolically by the dotted lines in FIG. 2b.

The drive-mode dynamics is described by a second order transfer function given below in equation 1:

$$TF_p(s) = \frac{s}{m_p s^2 + (c_1 + c_2)s + (k_1 + k_2)}, \quad (1)$$

where the drive force is assumed to be the input to the system; velocity is taken as the output since it defines the amount of the Coriolis force $F_c$ generated by the proof mass 22. For the analysis, we assume that the drive-mode quality factor $$Q = \frac{\sqrt{m_p(k_1+k_2)}}{c_1+c_2} \gg 10,$$

which is typical for bulk micromachined devices even at atmospheric pressure. Then, the drive-mode resonant frequency can be accurately approximated by the undamped natural frequency given in equation 2:

$$\omega_n = \sqrt{(k_1+k_2)/m_p}. \quad (2)$$

The sense-mode dynamics can be described as a fourth order state-space in terms of the proof mass 22 displacement $x_p$ and velocity $\dot{x}_p$, and the detection mass displacement $x_d$ and velocity $\dot{x}_d$. The equations of motion given in equation 3 are:

$$\begin{bmatrix} x_p \\ \dot{x}_p \\ x_d \\ \dot{x}_d \end{bmatrix}_t' = \begin{bmatrix} 0 & 1 & 0 & 0 \\ \frac{k_1+k_2}{-m_p} & \frac{c_1+c_2}{-m_p} & \frac{k_2}{m_p} & \frac{c_2}{m_p} \\ 0 & 0 & 0 & 1 \\ \frac{k_2}{m_d} & \frac{c_2}{m_d} & \frac{k_1+k_2}{-m_d} & \frac{c_1+c_2}{-m_d} \end{bmatrix} \begin{bmatrix} x_p \\ \dot{x}_p \\ x_d \\ \dot{x}_d \end{bmatrix} + \begin{bmatrix} 0 \\ u \\ 0 \\ 0 \end{bmatrix}, \quad (3)$$

where the input signal u is the Coriolis acceleration experienced by the proof mass 22 in the sense direction, u∝(input angular rate)×(drive-mode velocity). The detection mass 24 does not move in the drive direction and thus does not produce a Coriolis force on its own.

If the y-axis displacement (or velocity) of the proof mass 22 is considered as an output of the system, the corresponding transfer function has a zero ("anti-resonance" condition) at the frequency given in equation 4:

$$\omega_0 = \sqrt{(k_2+k_3)/m_d}. \quad (4)$$

The proof mass 22 anti-resonance frequency is always located between the two sense-mode resonances as seen in the inset of FIG. 2b, and thus equation 4 provides a convenient design guideline for selecting parameters of the system.

Closed-form expressions for the two resonant frequencies of the detection mass 24 are also needed for the correct design of the coupled 2-DOF sense-mode. The selection of the resonant frequencies is governed by the eigenvalue equation:

$$\omega^4 - \omega^2(\omega_a^2 + \omega_b^2) + (\omega_a^2\omega_b^2 - \omega_{ab}^4) = 0, \quad (5)$$

where $$\omega_a^2 = \frac{k_1+k_2}{m_p}, \ \omega_b^2 = \frac{k_1+k_2}{m_d}, \text{ and } \omega_{ab}^2 = \frac{k_2}{\sqrt{m_p m_d}}.$$

These three frequencies are commonly used in 2-DOF systems design and have intuitive interpretations: $\omega_a$ is the uncoupled natural frequency of the proof mass $m_p$, $\omega_b$ is the uncoupled natural frequency of the detection mass 24 $m_d$, and $\omega_{ab}$ is the coupling frequency. Solution to the eigenvalue equation 5 is given by equation 6:

$$\omega^2 = \frac{1}{2}[\omega_a^2 + \omega_b^2 \pm \sqrt{(\omega_a^2-\omega_b^2)^2 + 4\omega_{ab}^4}], \quad (6)$$

which defines the locations of the two coupled sense-mode resonances.

The available structural design parameters for the proposed gyroscope 10 are the two masses $m_p$ and 24 $m_d$ and three stiffnesses $k_1$, $k_2$, and $k_3$. These five parameters define the location of the drive-mode resonant frequency, i.e. the operational frequency of the gyroscope 10, and the locations of the two sense-mode resonant peaks, which define the bandwidth of the gyroscope 10. In practice, the operational frequency and bandwidth requirements are dictated by the specific application. Here, we derive closed form expressions for the five design parameters. During the design stage, these expressions can be evaluated to obtain a gyroscope implementation with prescribed operational frequency and frequency spacing.

We denote the desired operational frequency by $\Phi$ and the desired sense-mode peak spacing by $\Delta\Phi$. In order to ensure the optimal nominal positioning of the drive-mode resonance with respect to the 2-DOF sense-mode response, we require that the drive-mode resonance coincides with the proof mass antiresonance in the sense-mode. This additional design requirement means that $\omega_n = \omega_0$, or equivalently, $$\omega_a = \omega_b. \quad (7)$$

This relation completes the mathematical description of the design problem, which can now be solved analytically. From equations 6 and 7, the two coupled resonant frequencies of the detection mass 24 are given by equation 8:

$$\begin{cases} \omega_1 = \sqrt{\omega_n^2 - \omega_{ab}^2}, \\ \omega_2 = \sqrt{\omega_n^2 + \omega_{ab}^2}. \end{cases} \quad (8)$$

We assume that the masses 22 and 24 of the gyroscope 10 together with the capacitive electrodes are implemented first. Then, the three stiffnesses $k_1$, $k_2$, and $k_3$ become functions of the two masses 22 $m_p$ and 24 $m_d$, and selection of the desired operational frequency $\Phi$ and the desired frequency spacing $\Delta\Phi$. Finally, the system of three algebraic equations defining the stiffnesses is:

$$\begin{cases} \Phi^2 = \frac{k_1+k_2}{m_p}, \ \Phi^2 = \frac{k_2+k_3}{m_d}, \\ \Delta\Phi = \sqrt{\Phi^2 + \sqrt{\frac{k_2^2}{m_p m_d}}} - \sqrt{\Phi^2 - \sqrt{\frac{k_2^2}{m_p m_d}}}. \end{cases} \quad (9)$$

Solving equation 9 for the stiffnesses yields equation 10:

$$\begin{cases} k_1 = m_p \Phi^2 - k_2, \\ k_2 = \Delta\Phi \sqrt{m_p m_d} \sqrt{\Phi^2 - \frac{\Delta\Phi^2}{4}}, \\ k_3 = m_d \Phi^2 - k_2. \end{cases} \quad (10)$$

The unique solutions exist as long as $\Phi \geq \Delta\Phi/2$, which holds for any physically meaningful combination of the operational frequency and the frequency spacing. In practice, the desired operational frequency is between 2 to 20 kHz, while the desired sense-mode bandwidth is in the range of a few hundred Hz. For these conditions, $\Phi^2 \gg \Delta\Phi^2/4$, and a simple yet accurate approximation for $k_2$ can be obtained as $k_2 \approx \sqrt{m_p m_d} \Delta\Phi$.

Based on equation 9, a design algorithm is formulated that yields an implementation of the proposed gyroscope 10 with desired operational frequency and sense-mode peak spacing. In summary, the algorithm for selection of the structural parameters includes three steps. First, the desired values for the operational frequency Φ and the sense-mode peak spacing ΔΦ are identified based on the application requirements. Second, the outer anchor frame, the four shuttles, the two masses $m_p$, $m_d$ and the inner anchor are designed in a form of mask layout according to the desired die size, available microfabrication tolerances and desired nominal values of actuation and detection capacitances. Third, the necessary stiffnesses $k_{1,2,3}$ are obtained using equation 10, and implemented in a form of mask layout. The procedure yields a design concept implementation with the required operational frequency and sense-mode frequency spacing. Due to the high symmetry of the structure, the operational frequency is guaranteed to be optimally placed between the sense mode peaks, even in presence of considerable fabrication imperfections as detailed further below.

Figure 8:
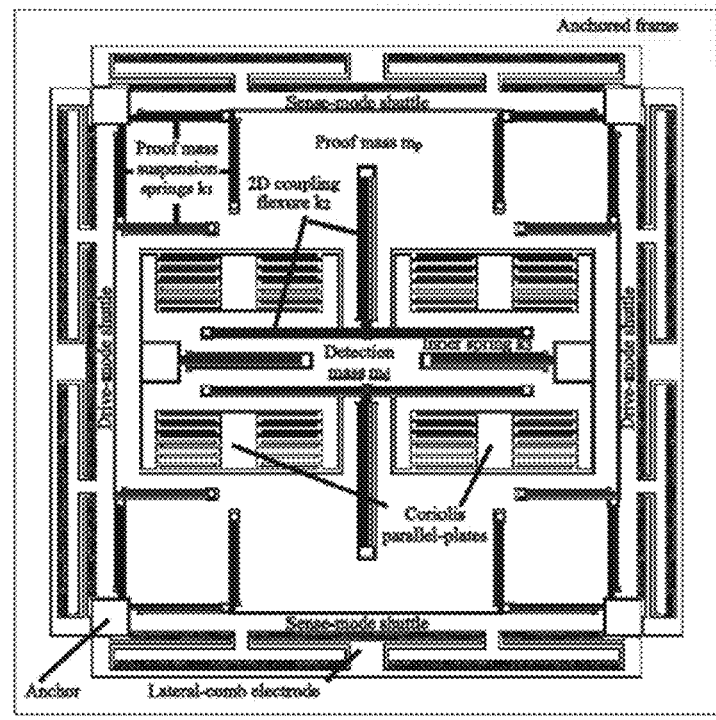
FIG. 8 is an example of two layouts of the micromachined gyroscope in a cross-shaped design, one with lateral-comb drive electrodes and another with parallel-plate drive electrodes.
Figure 8:
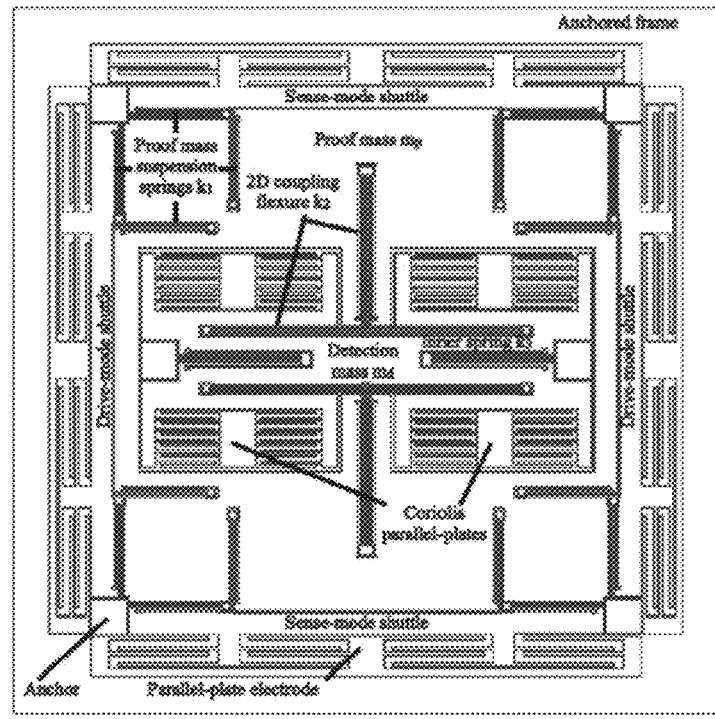
Figure 9:
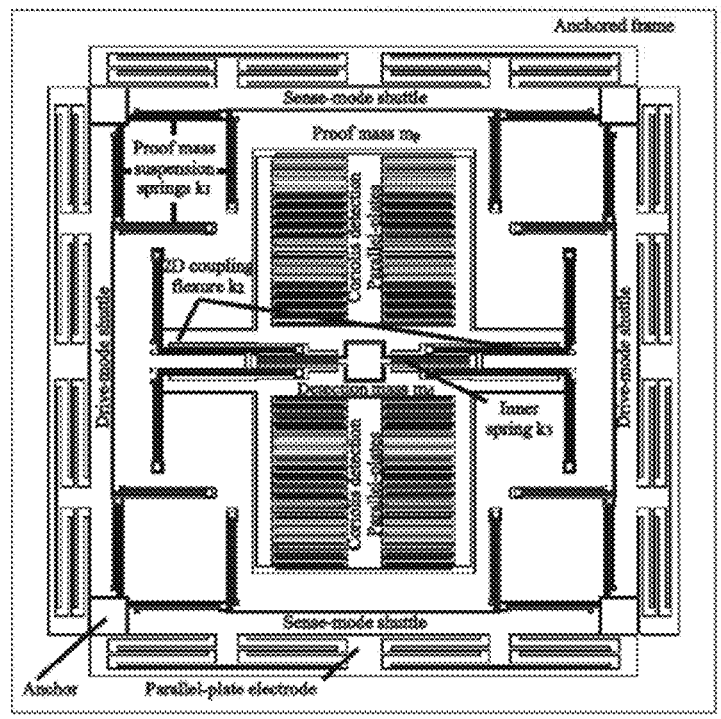
FIG. 9 is an example of two layouts of the micromachined gyroscope, the first in a crab-shaped design, and the second in a frame-shaped design.
Figure 9:
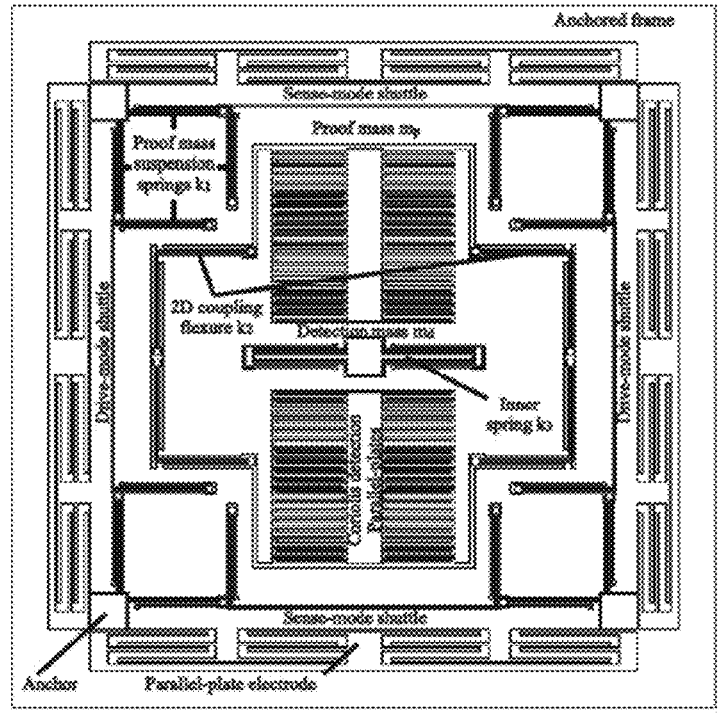

Several different physical layout implementations of the current gyroscope are presented. It is to be expressly understood that the disclosed layout implementations are for purposes of illustration only and that other layout implementations currently in use or later devised may also be used without departing from the original spirit and scope of the invention. The main difference between the three layouts is in the implementation of the 2D coupling flexure $k_2$, which consequently effects the layout of the detection mass 24 and Coriolis detection electrodes. FIG. 8 shows two versions of the first layout, designated as a cross-shaped layout. Two additional physical layouts, a crab-shaped layout and a frame-shaped layout are shown in FIG. 9. Here, we derive asymptotic expressions for the nominal gain of the proposed gyroscope 10 and analyze how it is affected by the choice of the operational frequency and the sense-mode frequency spacing. In capacitive gyroscopes, velocity of the detection mass 24 is often directly measured using motional-current detection techniques. Thus, the gain of a gyroscope's sense-mode can be defined without loss of generality as the amplitude of the detection mass 24 velocity normalized with respect to the input Coriolis acceleration. A qualitative measure of the gyroscope's gain can be obtained by evaluating the gain of the sense-mode transfer function at the nominal operational frequency. Assuming the Coriolis acceleration is the input and velocity of the detection mass 24 is the output, the gain of gyroscope 10 is defined as:

$$G_V = \frac{\omega_a}{\omega_{ab}^2}\sqrt{\frac{m_p}{m_d}} = \frac{\Phi}{\Delta\Phi\sqrt{\Phi^2 - \frac{1}{4}\Delta\Phi^2}}\sqrt{\frac{m_p}{m_d}} \approx \frac{1}{\Delta\Phi}\sqrt{\frac{m_p}{m_d}}, \quad (11)$$

for $\Phi^2 \gg \Delta\Phi^2/4$, where the effect of the damping terms have been ignored to simplify the qualitative analysis. The velocity gain $G_V$ does not depend on the operational frequency; it is inversely proportional to the frequency spacing ΔΦ and to the square root of the mass ratio, $\mu=\sqrt{m_d/m_p}$.

For both the proposed gyroscope 10 and the DVA-based design the gain is inversely proportional to the sense-mode peak spacing. In the DVA-based design, the peak spacing cannot be adjusted freely without a sacrifice in detection capacitance and/or enlargement of the die due to the mass ratio constraint. This limitation is eliminated in the current device, where the peaks can be positioned arbitrary close to each other independent of the operational frequency and the mass ratio.

Here, we present modeling that illustrates and verifies the developed design approach. From the analysis, we derive the effects of operational frequency scaling and peak spacing in presence of damping. Based on the parameters of the experimentally characterized devices, we set the values of the proof mass 22 and detection mass 24 to $m_p$=4.72e-7 kg and $m_d$=1.35e-7 kg, so that $\mu^2$=0.286. The values of damping coefficients were set to $$c_1 = 1e-4\frac{N-s}{m}, c_2 = 5e-6\frac{N-s}{m}, \text{ and } c_3 = 2c_1 = 2e-4\frac{N-s}{m}.$$

It is assumed that the device is operated in air, the drive-mode quality factor Q is approximately 75, the damping between the proof mass 22 and the detection mass 24 is relatively small, and the damping between the Coriolis detection parallel-plates is dominant due to the large overlap area and narrow gaps.

Figure 3A:
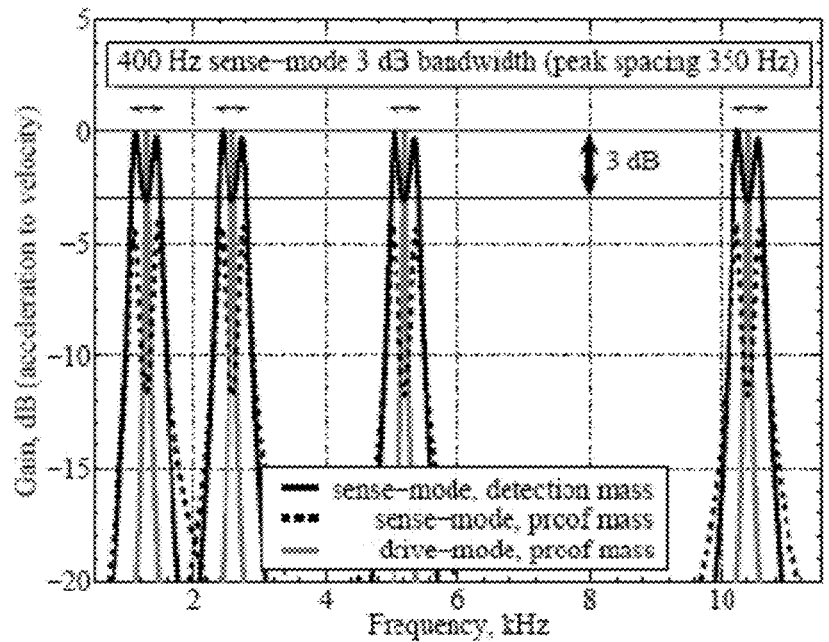
FIG. 3a is a graphical representation of gain versus frequency for the sense-mode of the detection mass and the sense- and drive-modes for the proof mass of the gyroscope while the sense-mode frequency spacing is kept constant at 350 Hz.
Figure 3B:
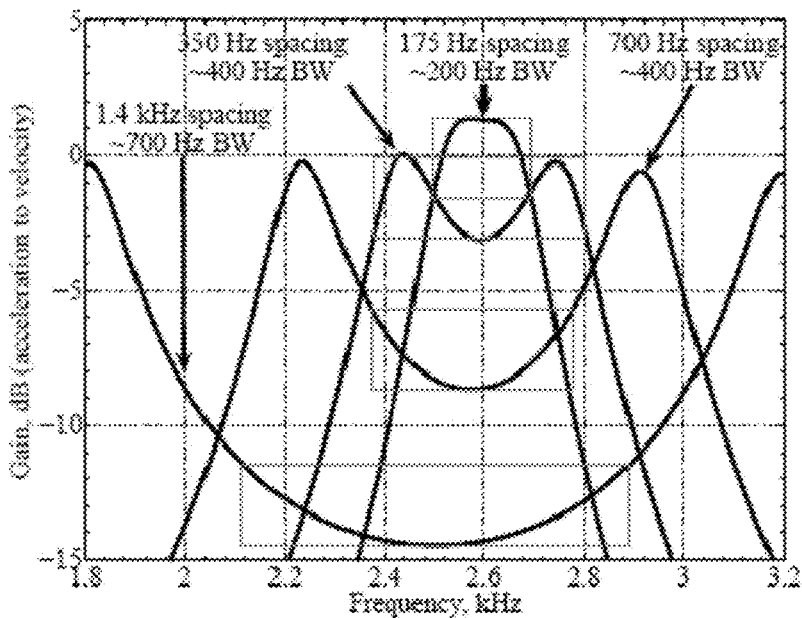
FIG. 3b is a graphical representation of gain versus frequency for the sense-mode of the detection mass and the sense- and drive-modes for the proof mass of the gyroscope while the operational frequency is kept constant at 2.6 kHz.

FIGS. 3a and 3b show a simulation of the effects of the operational frequency and the sense-mode frequency spacing on the frequency response characteristics of the gyroscope. The frequency responses of the drive- and sense-modes are analyzed assuming the force is the input and velocity is the output. In FIG. 3a the operational frequency is iterated through 1.3, 2.6, 5.2, and 10.4 kHz, while the sense-mode frequency spacing is kept constant at 350 Hz. The modeled responses show that the velocity gain does not depend on the operational frequency, which agrees with the qualitative study of the gain. In FIG. 3b the operational frequency is set to 2.6 kHz, while the sense-mode peak spacing is iterated through 175, 300, 700, and 1400 Hz. The presented curves show that as the peak spacing increases, the gain consequently drops.

The modeling results confirm that the design approach indeed yields implementations with the prescribed operational frequency and the sense-mode frequency spacing is independent of the proof and detection mass values. Assignment of the operational frequency and the peak spacing is not constrained by the mass ratio. Also, the operational frequency is automatically positioned optimally between the sense-mode peaks, eliminating the need for trimming and tuning of the drive-mode. In gyroscope designs found in the prior art with a 2-DOF sense-mode, the correct positioning of the drive mode is not guaranteed by the structural design due to the difference in suspensions outside and inside of the decoupling frame.

The sense-mode of the current gyroscope 10 can be designed in two alternative ways. The two peaks can be placed far apart relative to their individual bandwidths. This configuration is functionally identical to the previously proposed 3-DOF gyroscope. It can provide very wide bandwidth at the cost of the drop in the response gain. In the previous DVA based design, the high-gain peaks cannot be incorporated into the bandwidth in devices with practical size and operational frequency, resulting in a lower sensitivity.

Due to the flexibility of the extended design space of the current gyroscope 10, the two peaks can be placed close together. In this case, the sense-mode response of the detection mass 24 has an increased bandwidth, composed of the two coupled resonant peaks and the region in between, while the gain is comparable to the mode-matched case. For this configuration, the sense-mode dynamics is similar to coupled micro-mechanical filters and can be shaped to a desired profile. The described configuration is preferable for applications requiring operational frequencies in 2-20 kHz range and a bandwidth on the order of 100-350 Hz.

The fabrication of the prototypes was done using an in house wafer-level two-mask SOI process. P-type SOI wafers with a 50 μm thick device layer and a 5 μm buried oxide layer were used. The first mask was used to define metallization of bonding pads using a lift-off process. The second mask defined the structural layout. After patterning photoresist with the second mask, the wafers were subjected to a Deep Reactive Ion Etching (DRIE) using a Surface Technology Systems (STS) tool. The fabricated wafers were then cleaned and diced. Individual devices were then released in a HF acid bath. The minimal capacitive feature dimension of the process was 5 μm and the minimal structural feature was 8 μm. An SEM image of a fabricated device with lateral-comb drive electrodes is shown in FIG. 1. The fabricated devices were packaged using a ceramic DIP-24 package and wirebonded for experimental characterization.

Figure 4A:
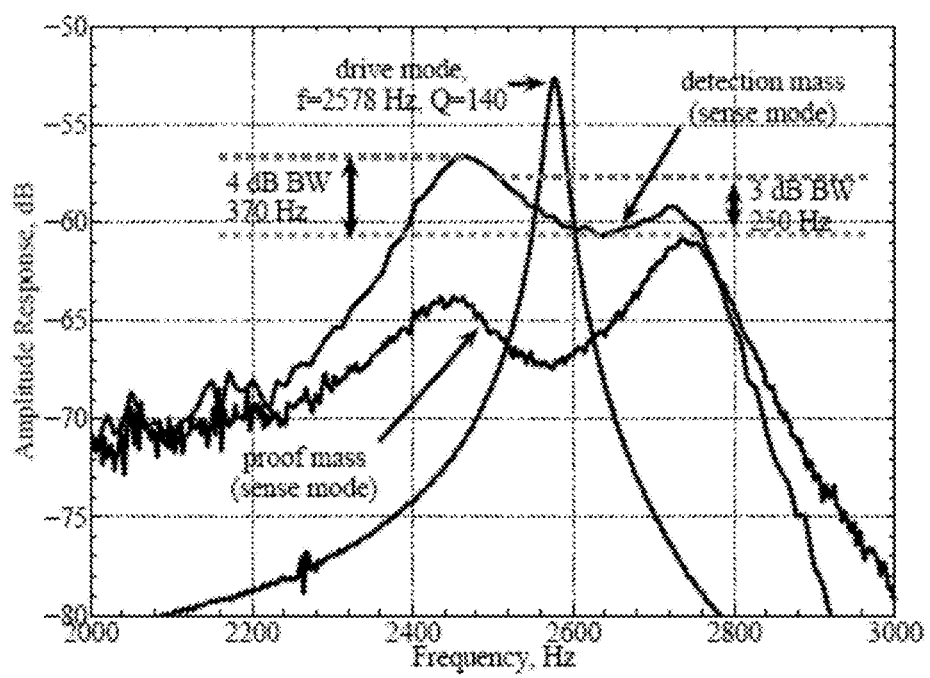
FIG. 4a is a graphical representation of the experimental characterization of the gyroscope with lateral-comb drive electrodes in atmospheric pressure.
Figure 4B:
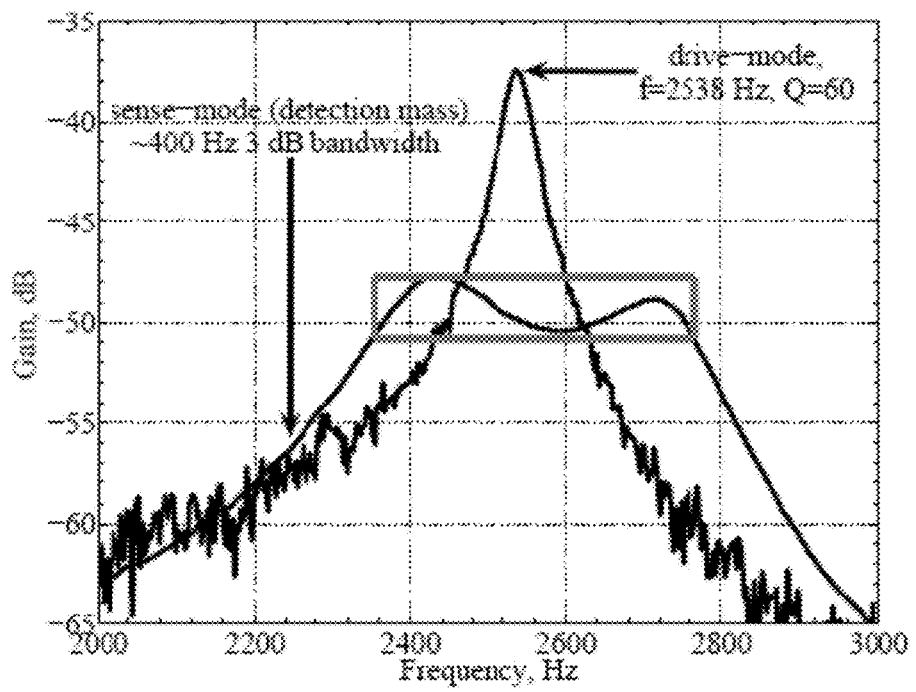
FIG. 4b is a graphical representation of the experimental characterization of the gyroscope with parallel-plate drive electrodes.

Experimental characterization of the lateral-comb device in atmospheric pressure is shown in FIG. 4a. The measured drive-mode resonant frequency was 2.58 kHz and was located in-between the 2-DOF sense-mode resonances at 2.47 and 2.73 kHz. The measured drive-mode quality factor was Q=140. A 250 Hz 3 dB cut-off bandwidth was formed in the sense-mode by the two resonant peaks and the region in-between. In this configuration, the designed peak spacing is slightly wider than the optimal due to overestimation of the damping during the design stage. In case of parallel-plate drive electrodes, the damping term associated with the proof mass 22 increases about two times, which yields a 400 Hz 3 dB sense-mode bandwidth as seen in FIG. 4b.

Figure 10:
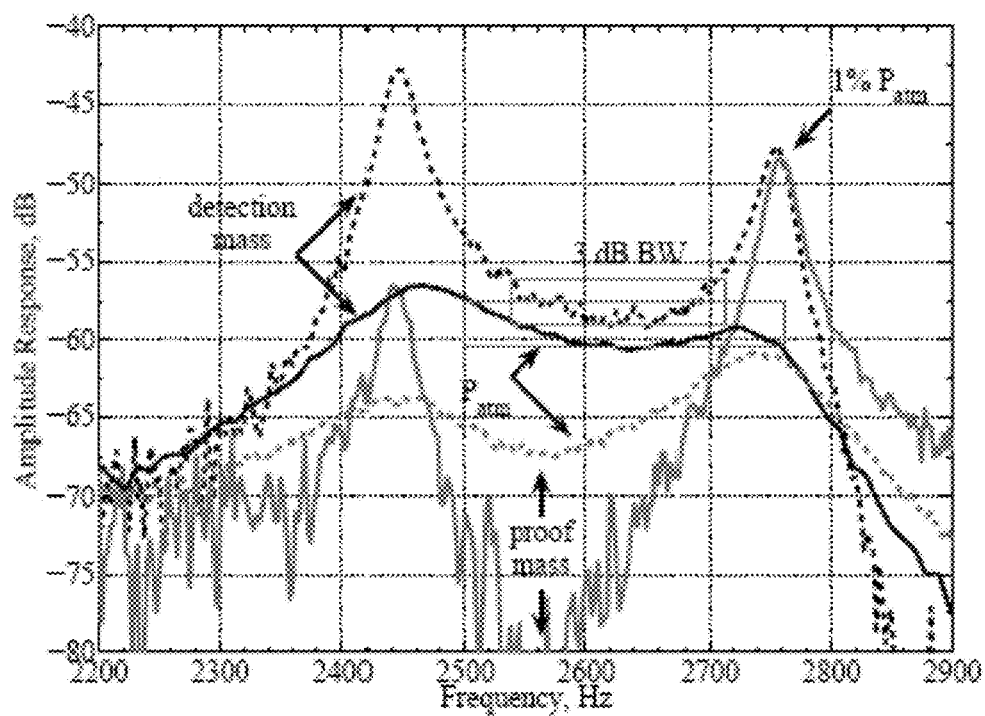
FIG. 10 is a graphical representation of the effect of pressure on the sense-mode response of the gyroscope.

FIG. 10 shows one embodiment of the present invention which demonstrates the experimental characterization of the effect of pressure on the 2-DOF sense-mode frequency response. It confirms that the proof mass 22 response has a zero ("anti-resonance") at decreased damping levels. Also, as the damping is decreased, the gain at the two individual sense-mode peaks is increasing; the valley gain also increases, but at a much slower rate. As a result, the peaks escape the 3 dB gain-bandwidth region around the operational frequency, resulting in significant narrowing of the bandwidth. In order to achieve optimal gain-bandwidth characteristics, the peaks should be incorporated into the bandwidth. Luckily, the proposed gyroscope 10 allows for arbitrary sense-mode spacing. Depending on the expected packaging pressure and consequently damping levels, the two peaks can be designed to be close enough to merge into one increased bandwidth, as discussed above. FIG. 10 is meant to be for illustrative purposes only and it is to be expressly understood that additional similar embodiments using different frequencies may be used without departing from the original spirit and scope of the invention.

Temperature robustness of the gyroscopes, defined as the low sensitivity of the bias and scale factor to temperature variations, is a critical performance parameter of gyroscopes targeted for real-world harsh environment applications, such as for consumer electronics, automotive, and defense industries. The fabricated prototypes were experimentally characterized in variable temperature environment using a custom made, package-level heater equipped with a feedback control.

Figure 5A:
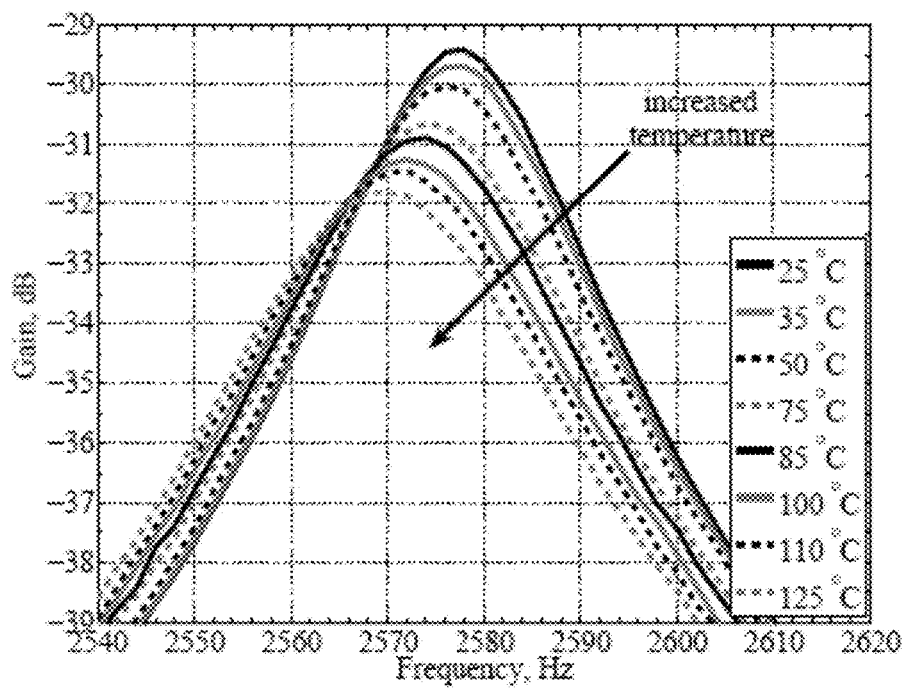
FIG. 5a is a graphical representation of the characterization of the temperature variations on the drive-mode of the gyroscope in air.

FIG. 5a shows characterization of the temperature drifts of the single-DOF drive-mode in air. Increase of temperature from 25° C. to 125° C. results in a 2.25 dB drop in gain and a −8 Hz shift of the resonant frequency. The linear fit of the resonant frequency and gain versus temperature estimated the frequency temperature sensitivity of −31 ppm/° C., and the gain sensitivity of −2404 ppm/° C., respectively. In reduced pressure, the quality factor temperature sensitivity increases by orders of magnitude.

Figure 11:
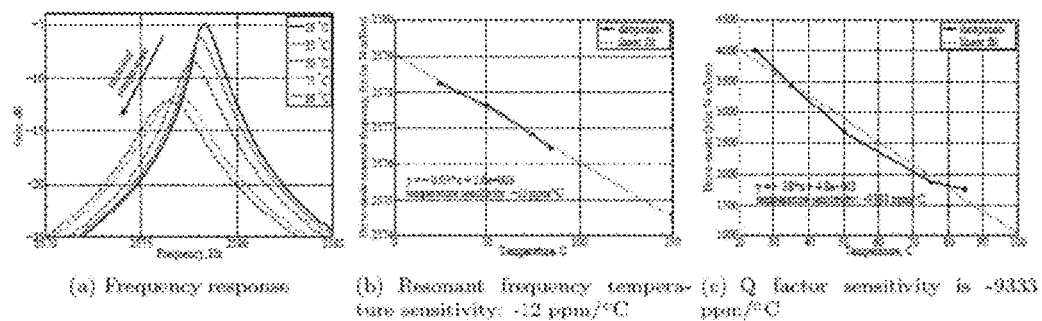
FIG. 11 is a graphical representation of the effect of temperature variations on a 1-DOF drive-mode of the gyroscope in a pressure of 75 mTorr, including the frequency response, resonant frequency temperature sensitivity, and Q factor sensitivity.

In one embodiment, the temperature drift of the single-DOF drive-mode in 74 mTorr vacuum is characterized in FIG. 11. Increase of temperature from 25° C. to 85° C. results in more than 7 dB drop in gain as seen FIG. 11(c), and a −2 Hz shift of the resonant frequency, as seen in FIG. 11(b). From the measured data, the resonant frequency temperature sensitivity is estimated as −12 ppm/° C., and the quality factor sensitivity is estimated as −9333 ppm/° C. While the resonant frequency temperature sensitivity in vacuum is less than in air, the quality factor temperature sensitivity increases almost 4 times in vacuum. FIG. 11 is meant to be for illustrative purposes only and the technical and implementation features disclosed therein are not meant to limit the current invention is any way. Similar features such as varying temperatures and pressures may be used without departing from the original spirit and scope of the invention.

Drive-mode temperature drifts are easily mitigated by closed loop operation. However, the severe drop of gain in the sense-mode can be detrimental to accuracy of conventional mode-matched gyroscopes, where the scale factor changes several times over the typical temperature range. In the current gyroscope 10, the sense-mode temperature drift of the sense-mode is minimized by using the 2-DOF structure. This eliminates the need for any active temperature compensation for a wide range of operational temperatures, such as from −55° C. to 125° C. required for automotive applications.

Figure 5B:
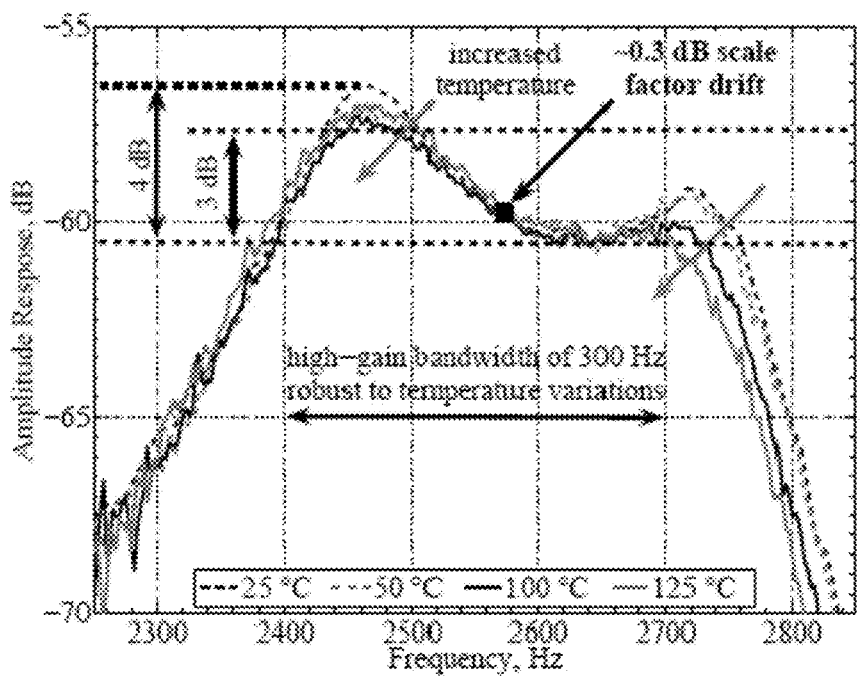
FIG. 5b is a graphical representation of the characterization of the temperature variations on the sense-mode of the gyroscope in air.

Sense-mode frequency-response of the detection mass was experimentally characterized at 4 different temperatures ranging from 25° C. to 125° C. The results are shown in FIG. 5b and reveal that the proposed design possesses inherent robustness to temperature variations. Increase of temperature from 25° C. to 125° C. results in approximately 1 dB change of the gain in a 300 Hz bandwidth. The temperature change in the sense-mode gain evaluated at the corresponding drive-mode resonance frequency is approximately 0.3 dB over a 100° C. range. This yields the scale-factor temperature coefficient of 351 ppm/° C.—almost an 8 times improvement compared to the 1-DOF case of −2404 ppm/° C., measured using the drive-mode. The temperature coefficient of the sense-mode phase was determined as 0.08°/° C. The phase temperature coefficient is used together with quadrature to obtain the temperature coefficient of the bias of the gyroscope 10.

We cite here temperature performance data of some of the most successful commercial MEMS gyroscopes. The uncompensated thermal sensitivities of higher performance quartz TFGs units from Custom Sensors and Technologies (formerly Systron Donner/BEI) is 300 ppm/° C.; Analog Devices' automotive-grade polysilicon angular rate sensor ADXRS150 specifies scale factor uncompensated thermal sensitivity of 1700 ppm/° C.; highly optimized single crystal silicon Draper's design with 5-15% mismatched modes used in Honeywell's navigation systems has a 250 ppm/° C. scale factor temperature coefficient. The current gyroscope's 10 uncompensated scale factor temperature coefficient of approximately 350 ppm/° C. was measured using a first generation, proof-of-concept device, and is already on par with state of the art commercial vibratory gyroscopes. The thermal robustness of the proposed gyroscope can be improved even further by increasing the spacing between the sense-mode resonant peaks using the design equations 10.

The angular rate performance of the prototype was experimentally characterized using a computer controlled Ideal Aerosmith 1291 BR rate table. The gyroscope 10 was driven into 5 μm peak-to-peak resonant motion using a combination of a 30 V DC bias and a 3.5 Vrms AC driving voltage applied to the anchored drive-mode lateral comb electrode. An Electro-Mechanical Amplitude Modulation (EAM) technique was used to detect the Coriolis-induced motion in the sense-mode. The AC carrier voltage with 3.5 Vrms amplitude at 20.5 kHz frequency was applied to the mobile masses; the anchored sense-mode parallel-plate electrode was connected to the inverting input of an operational amplifier, configured as a transimpedance amplifier.

Figure 6:
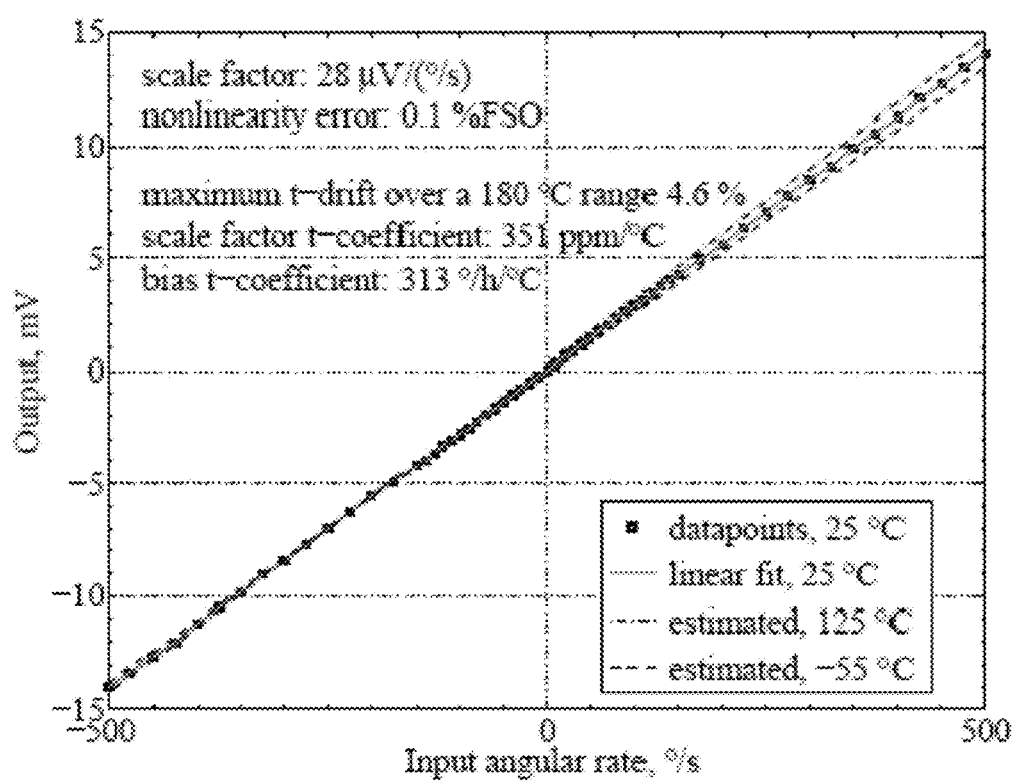
FIG. 6 is a graphical representation of the calibration rate plot, showing the measure relationship between angular rate input and the sensor voltage output.
Figure 7:
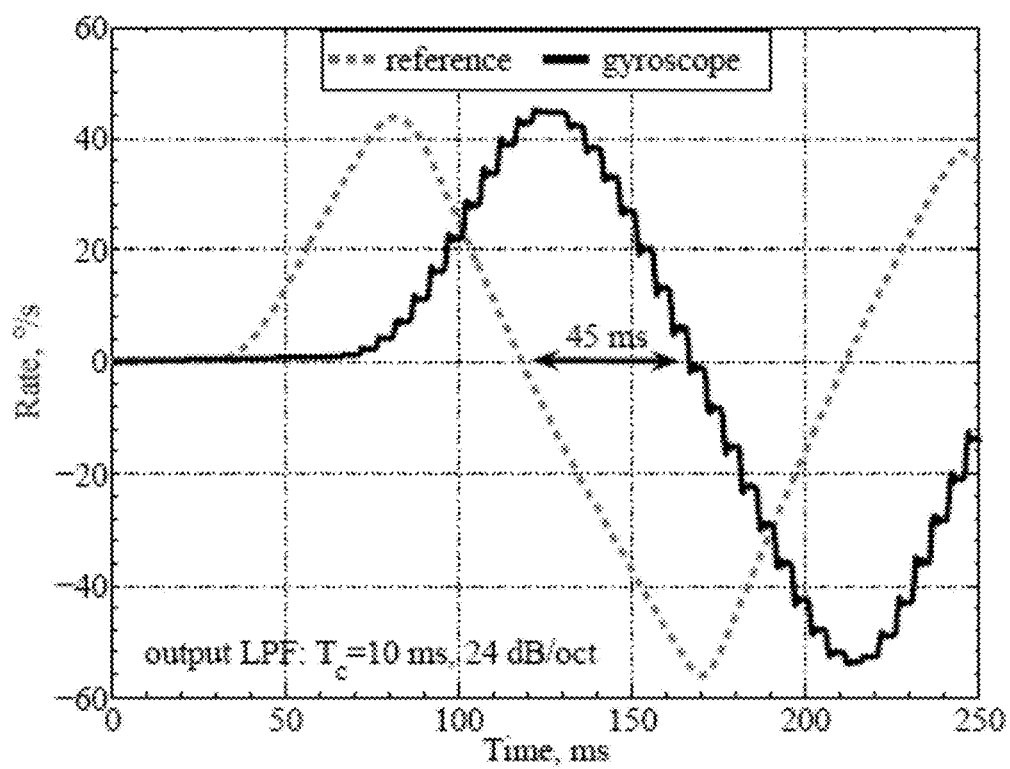
FIG. 7 is a graphical representation of the response to the gyroscope to a fast dynamic angular rate excitation.

FIG. 6 shows the calibration curve obtained by programming the rate table to constant angular rate motion and observing the corresponding voltage output of the gyroscope. The collected data points were fitted with a line to reveal the sensitivity of 28 μV/°/s. As only a single sided capacitor was used, the total sensitivity of the device is 56 μV/°/s for the same operational conditions. A 62.5°/s rate equivalent quadrature was measured by observing the out-of-phase output of the gyroscope at zero rate. Using the simple non-differential detection scheme, the measured resolution was 0.09°/s/$\sqrt{Hz}$. As described in the prior art, the resolution is expected to improve to approximately 0.01°/s/$\sqrt{Hz}$ using a complete differential detection scheme. FIG. 7 demonstrates another embodiment that shows the response of the gyroscope 10 to a dynamic rate excitation. The response, updated at a 10 ms rate, accurately traces the changing rate; the 45 ms delay is due to the output filter (24 dB/oct, 10 ms time constant) of the electronics. FIG. 7 is meant to be for illustrative purposes only and that the technical and implementation specific features such as updating the response at a different rate are not meant to limit the current invention in any way. Similar features may be used without departing from the original spirit and scope of the invention.

Using the structural characterization results presented in the previous section, the gyroscope's 10 scale factor temperature sensitivity was estimated to be 351 ppm/° C. The bias temperature sensitivity is calculated as (quadrature)×(phase temperature sensitivity)=(62.5°/s)×(0.00139 1/° C.)=313°/h/° C. FIG. 6 shows the rate response curves for −55° C. and 125° C. temperatures calculated using the bias and scale factor temperature coefficients. The estimated maximum temperature drift over the 180° C. range is less than 4.6%.

In summary, we have presented a novel gyroscope design concept, which utilizes a 1-DOF drive-mode and a fully coupled 2-DOF sense-mode, comprising two masses 22 and 24 with three suspension elements 28 and 29. In order to achieve optimal gain-bandwidth characteristics, the sense-mode bandwidth is defined by the two resonant peaks and the frequency region in between. Due to the high symmetry of the structure, the operational frequency is guaranteed to be optimally placed between the sense-mode peaks even in presence of considerable fabrication imperfections. The provided closed form design equations allow for straightforward realization of the concept for arbitrary application-specific operational frequencies and bandwidths. The rate sensitivity and quadrature of the gyroscope 10 are similar to the best reported performance numbers for MEMS gyroscopes operated in air. At the same time, based on the estimated scale factor temperature coefficient of −350 ppm/° C., a ±90° C. change of operational temperature results in only a ±3% change of the gyroscope's 10 scale factor.

Figure 13:
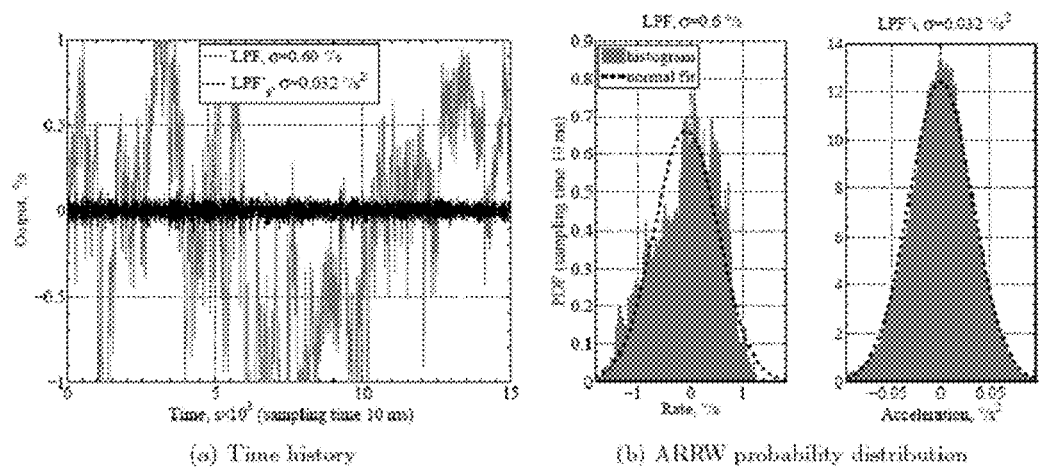
FIG. 13 is a graphical representation of the characterization of zero rate output low frequency noise modes, including the time history and ARRW probability distribution.
Figure 12:
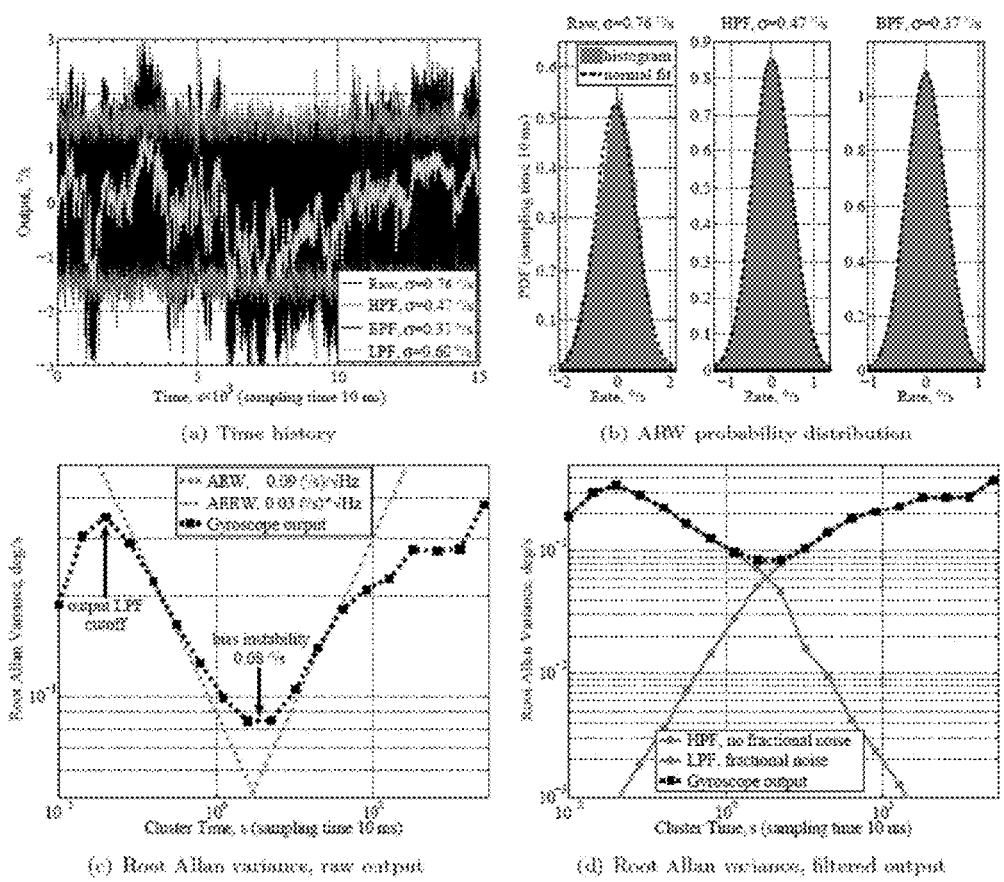
FIG. 12 is a graphical representation of the characterization of zero rate output noise modes, including the time history, ARW probability distribution, Root Allan variance, raw output and Root Allan variance, filtered output.
Figure 14:
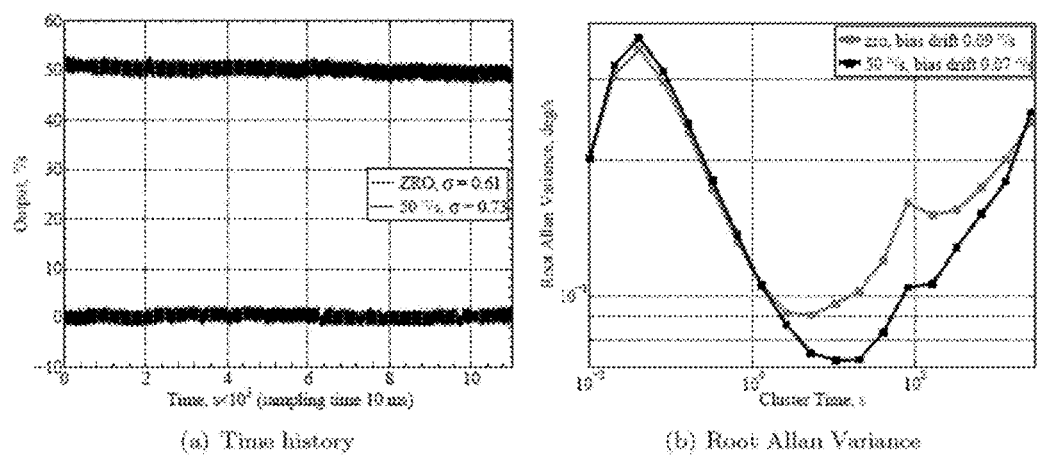
FIG. 14 is a graphical representation of the characterization of noise modes at a constant nonzero rate of rotation, including the time history and Root Allan variance.

FIGS. 12 and 13 show additional embodiments in which characterization and analysis of the noise modes in the gyroscope's 10 Zero Rate Output (ZRO). From the Root Allan Variance plot, FIG. 12(c), the measured Angle Random Walk (ARW) is 0.09°/s/$\sqrt{Hz}$, bias instability is 0.08°/s, and Angle Rate Random Walk (ARRW) is 0.03°/s×$\sqrt{Hz}$. FIG. 14 compares noise performance of the gyroscope 10 at zero rate and at a 50°/s constant rate rotation. During rotation, the ARW stayed at the same level, while the ARRW and the bias drifts slightly improved, indicating good in-operation noise performance of the gyroscope.

The noise performance numbers of the proposed gyroscope 10 are comparable to performance of gyroscopes found in the prior art operated in air despite the crude, non-differential, shelf-top electronics setup. As previously investigated, the rate equivalent noise is expected to decrease at least an order of magnitude upon employment of a complete differential detection scheme, yielding ARW on the order of tens of °/h/$\sqrt{Hz}$, ARRW on the order of single °/h×$\sqrt{Hz}$, and bias instability not more than few tens of °/h. The technical and implementation specific features contained within FIGS. 12 and 13 are meant for illustrative purposes only and are not meant to be limiting the current invention in anyway. Similar features may be used without departing from the original spirit and scope of the invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of manufacturing a 3-DOF dynamic gyroscopic system which yields implementations to a pre-selected operational frequency and sense-mode peak spacing comprising:

selecting two drive-mode shuttles, two sense-mode shuttles, a detection mass, and a proof mass;

calculating the required stiffness of a plurality of suspension elements according to the pre-selected operational frequency and sense-mode spacing; and coupling the suspension elements to the two drive-mode shuttles, the two sense-mode shuttles, the detection mass, and the proof mass.

2. The method of claim 1 where the two drive-mode shuttles, the two sense-mode shuttles, the detection mass, and the proof mass are selected based on a desired die size and capacitance of the 3-DOF dynamic gyroscope system.

3. The method of claim 1 further comprising ensuring that the operational frequency is optimally located between the sense-mode peaks even in the presence of large fabrication imperfections.

* * * * *